US007902999B2

(12) United States Patent
Eick

(10) Patent No.: US 7,902,999 B2
(45) Date of Patent: Mar. 8, 2011

(54) GAS TURBINE ENGINE ROTOR LOCK PREVENTION SYSTEM AND METHOD

(75) Inventor: Chris D. Eick, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 539 days.

(21) Appl. No.: 12/105,835

(22) Filed: Apr. 18, 2008

(65) Prior Publication Data
US 2009/0261989 A1    Oct. 22, 2009

(51) Int. Cl.
*G08B 23/00*    (2006.01)
(52) U.S. Cl. ....... 340/963; 340/966; 340/969; 60/39.091
(58) Field of Classification Search ............. 340/963, 340/964, 966, 968, 969; 701/100, 111; 60/39.91, 60/39.281, 773, 779, 39.091; 123/262, 308
See application file for complete search history.

(56) References Cited

U.S. PATENT DOCUMENTS

| | | | |
|---|---|---|---|
| 2,827,621 A | 3/1958 | Reichert et al. | |
| 3,440,601 A | 4/1969 | Knapp | |
| 3,611,282 A | 10/1971 | Hill | |
| 4,454,754 A | 6/1984 | Zagranski et al. | |
| 4,581,888 A * | 4/1986 | Schmitzer et al. | 60/39.091 |
| 4,590,475 A | 5/1986 | Brown | |
| 4,794,755 A * | 1/1989 | Hutto et al. | 60/39.281 |
| 4,908,619 A * | 3/1990 | Bala et al. | 340/966 |
| 5,163,316 A | 11/1992 | Toyoda et al. | |
| 5,225,829 A | 7/1993 | Bateman | |
| 5,363,317 A * | 11/1994 | Rice et al. | 702/34 |
| 6,176,074 B1 * | 1/2001 | Thompson et al. | 60/773 |
| 6,293,085 B2 * | 9/2001 | Thompson et al. | 60/773 |
| 6,442,943 B1 * | 9/2002 | Harrison et al. | 60/779 |
| 6,978,597 B2 | 12/2005 | McKelvey et al. | |
| 7,088,264 B2 | 8/2006 | Riley | |
| 7,142,131 B2 | 11/2006 | Sikora | |
| 7,286,911 B2 | 10/2007 | Kane | |
| 2006/0182635 A1 | 8/2006 | Jayanth | |

\* cited by examiner

*Primary Examiner* — Van T. Trieu
(74) *Attorney, Agent, or Firm* — Ingrassia Fisher & Lorenz, P.C.

(57) ABSTRACT

A system and method of at least reducing the likelihood of a rotor lock in an aircraft gas turbine engine is provided. A determination is made that each propulsion gas turbine engine on an aircraft has experienced a flameout. The rotational speed of each propulsion gas turbine engine is compared to a predetermined threshold rotational speed and, if the rotational speed of each propulsion gas turbine engine is below the predetermined threshold rotational speed, a warning is supplied to a flight crew.

20 Claims, 2 Drawing Sheets

GAS TURBINE ENGINE ROTOR LOCK PREVENTION SYSTEM AND METHOD

TECHNICAL FIELD

The present invention generally relates to aircraft gas turbine propulsion engines and, more particularly, to a system and method for preventing, or at least inhibiting the likelihood of occurrence of, rotor lock conditions in aircraft gas turbine propulsion engines.

BACKGROUND

Core lock (or rotor lock) is a condition that can occur in non-operating gas turbine propulsion engines on aircraft that are in flight. In particular, in the unlikely event that a gas turbine propulsion engine experiences a flameout during flight, and if sufficient airflow is not maintained through the engine to keep the engine core rotating, differential cooling of the engine core may occur. Typical gas turbine propulsion engines are constructed of many different materials, both metal and non-metal, that cool at slightly different rates. Moreover, typical gas turbine propulsion engines are precision built. Thus, this differential cooling rate can cause a rotor lock condition. In some circumstances, once a rotor lock condition occurs, it may not be possible to restart the engine.

As most aircraft pilots can appreciate, a rotor lock condition can inhibit or prevent either a windmill restart or an APU assisted restart of the engine. Indeed, in at least one particular aircraft incident a rotor lock condition was cited as a contributing cause. During that particular flight, both propulsion engines experienced a relatively high altitude flameout. As the aircraft drifted down to the engine re-light envelope, the flight crew did not maintain sufficient airspeed to keep the engine core rotating. As a result, both propulsion engines experienced rotor lock conditions and could not be restarted.

In response to the above-described incident, regulatory agencies began looking for solutions to prevent propulsion engine rotor lock in aircraft. Thus far, investigations have concentrated mainly on engine solutions and flight manual solutions. Unfortunately, engine solutions are likely to be rather difficult to implement. Flight manual solutions, while being relatively less difficult to implement, may not be sufficiently pragmatic, as this solution would rely on a flight crew referencing and reading a flight manual during a highly stressful situation. One further exacerbating factor associated with propulsion engine rotor lock prevention, is the somewhat counter-intuitive action that will prevent a rotor lock condition. That is, for most flight crews the intuitive action following a flameout of both engines is to fly the aircraft relatively slowly for maximum glide range. However, the needed action is to maintain aircraft speed above a sufficient speed to keep the propulsion engines, and most importantly the engine cores, rotating.

Hence, there is a need for a system and method of preventing, or at least inhibiting the likelihood of occurrence of, aircraft gas turbine propulsion engine rotor lock conditions that does not rely on relatively complex engine solutions and/or aircraft flight manual solutions and/or assists aircraft flight crews in taking potentially counter-intuitive actions. The present invention addresses one or more of these needs.

BRIEF SUMMARY

In one embodiment, and by way of example only, a method of at least reducing the likelihood of a rotor lock in an aircraft gas turbine engine includes determining that each propulsion gas turbine engine on the aircraft has experienced a flameout. The rotational speed of each propulsion gas turbine engine is determined and, a warning to a flight crew is supplied if the determined rotational speed of each propulsion gas turbine engine is below a predetermined threshold rotational speed.

In another embodiment, a gas turbine engine rotor lock warning system for an aircraft includes a rotational speed detector and a processor. The rotational speed detector is operable to detect the rotational speed of the propulsion gas turbine engine and to supply an engine rotational speed signal representative thereof. The processor is coupled to receive at least the engine rotational speed signal and is operable to determine if the gas turbine engine has experienced a flameout, determine if the rotational speed of the propulsion gas turbine engine is below a predetermined threshold speed, and supply a rotor lock prevention warning signal if the gas turbine engine has experienced a flameout and the rotational speed of the propulsion gas turbine engine is below the predetermined threshold speed.

In yet another embodiment, a gas turbine engine rotor lock warning system for an aircraft includes an aircraft state detector, a rotational speed detector, and a processor. The aircraft state detector is operable to detect a flight state of the aircraft and to supply a flight-state signal representative thereof. The rotational speed detector is operable to detect the rotational speed of the propulsion gas turbine engine and to supply an engine rotational speed signal representative thereof. The processor is coupled to receive the flight-state signal and the engine rotational speed signal and is operable, in response thereto, to determine the flight state of the aircraft, determine if the rotational speed of the propulsion gas turbine engine is below a predetermined threshold rotational speed, and if the aircraft is in flight and the rotational speed of the propulsion gas turbine engine is below the predetermined threshold speed, to supply a rotor lock prevention warning signal.

Furthermore, other desirable features and characteristics of the rotor lock prevention warning system and method will become apparent from the subsequent detailed description and appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, the rotor lock prevention system depicted and described herein may be implemented as a stand-alone system or integrated partially or fully in one or more existing aircraft systems.

Figure 1:
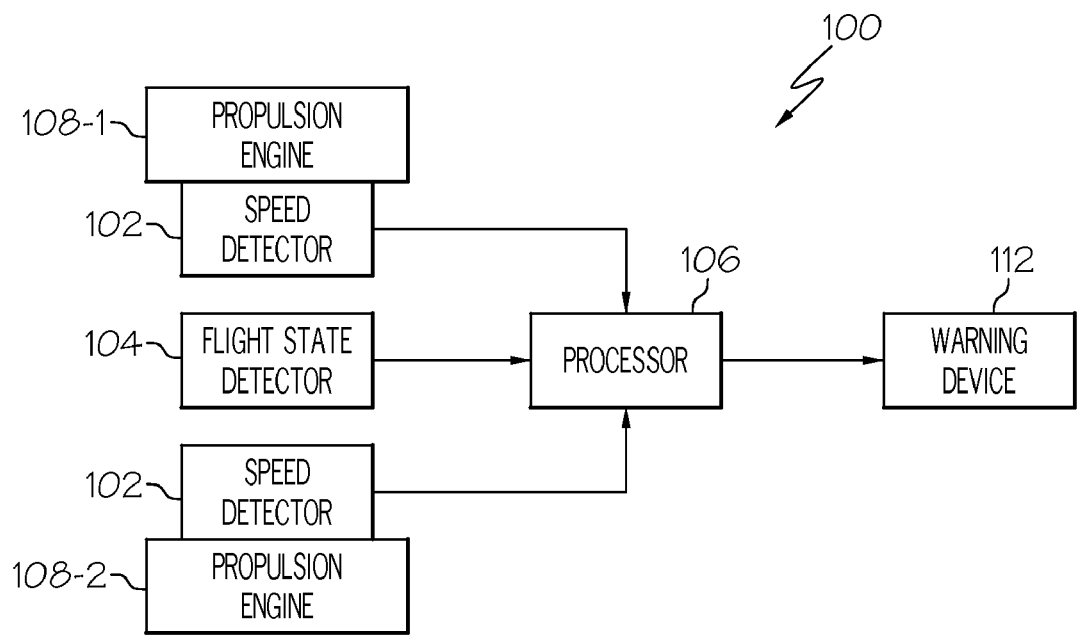
FIG. 1 depicts a functional block diagram of an exemplary embodiment of a rotor lock prevention warning system.

Turning now to FIG. 1, a block diagram of a rotor lock prevention system 100 for an aircraft is depicted, and includes a plurality of rotational speed detectors 102, an aircraft state detector 104, and a processor 106. The rotational speed detectors 102 are each associated with an aircraft gas turbine propulsion engine 108. In the depicted embodiment, two engines 108-1, 108-2 are depicted; however, the system 100 could be implemented in aircraft that include more or less than this number of propulsion engines 108. No matter the number of propulsion engines, each rotational speed detector 102 is operable to detect the rotational speed of its associated engine 108, and to supply a rotational speed signal representative thereof to the processor 106.

It will be appreciated that the number and type of rotational speed detectors 102 associated with each engine 108 may vary. Moreover, the specific rotational speed that each rotational speed detector 102 detects within its associated engine 108 may also vary. For example, although the system 100 is depicted with only one rotational speed detector 102 per engine 108, the system 100 could be implemented with a plurality of rotational speed detectors 102 per engine 108. Additionally, the rotational speed detectors 102 associated with each engine 108 may determine the rotational speed of the fan (e.g., N1), the rotational speed of the engine core (N2), or both, or various other rotational speeds or combinations. The rotational speed detectors 102 may also be implemented using any one numerous detectors suitable for detecting rotational speed including, for example, various Hall sensors, optical sensors, and semiconductor sensors, just to name a few. The rotational speed detectors 102 may also include suitable conditioning and/or processing circuitry, if needed or desired.

The aircraft state detector 104 is operable to detect a flight state of the aircraft, and to supply a flight-state signal representative thereof to the processor 106. The aircraft state detector 104 may be implemented using any one of numerous detectors suitable for detecting the flight state of an aircraft. In the depicted embodiment, an aircraft weight-on-wheels (WOW) detector 104 is used; however, the aircraft state detector 104 may be implemented using, for example, an aircraft altitude detector. It will be appreciated that although a single aircraft state detector 104 is depicted, the system 100 could be implemented with more than one aircraft state detector 104, if needed or desired. It will additionally be appreciated that the system 100, in at least some embodiments, could be implemented without the aircraft state detector 104.

The processor 106 is coupled to receive the engine rotational speed signals from each of the rotational speed detectors 102, and the flight-state signal from the aircraft state detector 104. The processor 106 is responsive to these signals to at least selectively generate and supply a rotor lock prevention warning signal. More specifically, the processor 106 is responsive to the flight-state signal to determine the flight-state of the aircraft. That is, the processor 106 determines if the aircraft is in flight. The processor 106 is responsive to each of the engine rotational speed signals to at least determine if the rotational speed of each propulsion gas turbine engine 108 is below a predetermined threshold rotational speed. If the processor 106 determines, based on these signals, that the aircraft is in flight and that rotational speed of the propulsion gas turbine engines 108 is below the predetermined threshold speed, the processor 106 generates and supplies the rotor lock prevention warning signal.

Before proceeding further, it is noted that the predetermined threshold rotational speed may vary and may depend, for example, on the particular design and configuration of the engines 108. Preferably, however, the predetermined threshold rotational speed is selected such that it is sufficiently indicative that a flameout of the engine 108 has occurred, and such that the flight crew will have sufficient time, upon generation of the rotor lock prevention signal, to increase airspeed to prevent the occurrence of a rotor lock. It is additionally noted that when the system 100 is installed in an aircraft with multiple propulsion engines 108, the processor 106 may be configured to generate and supply the rotor lock prevention warning signal only when the rotational speed of all of the propulsion engines 108 are below the predetermined threshold. For such configurations, the rotor lock prevention warning signal will therefore not be generated if at least one propulsion engine 108 remains available and operating to propel the aircraft.

Returning once again to the description of the system 100, the rotor lock prevention signal, when generated, is supplied to one or more suitable flight crew warning devices 112 (only one shown). The flight crew warning device 112 may be configured, in response to the rotor lock prevention signal, to generate an audible warning, a visual warning, or both (e.g., audio-visual warning), to the flight crew. If the flight crew warning device 112 generates an audible warning, the audible warning may also be variously implemented. For example, the audible warning may generate a continuous or periodic sound, or it may generate a suitable audible message such as, for example, "CORE LOCK, CORE LOCK, INCREASE SPEED." If the flight crew warning device 112 generates a visual warning, the visual warning may also be variously implemented. For example, the visual warning may be a continuous or periodically flashing light, or a textual message. The visual warning, no matter its form, may be supplied via a dedicated device, a suitable indicator already included in the aircraft, or rendered on one or more cockpit displays. No matter the particular form of the audio and/or visual warning, the flight crew is prompted to take action to increase aircraft speed, to thereby prevent rotor lock.

It was noted above that the system 100 could be implemented, in at least some embodiments, without the one or more aircraft state detectors 104. In the preferred embodiment, however, the one or more aircraft state detectors 104 are included. It is noted that if the one or more aircraft state detectors 104 are not included, the processor 106 may unnecessarily generate and supply the rotor lock prevention warning signal even if the aircraft is not in flight. In such embodiments, various provisions may be included in the system 100 to prevent the processor 106 from generating and supplying the rotor lock prevention warning signal if the aircraft is not in flight. For example, a pilot-operated switch or other suitable mechanism could be employed.

Figure 2:
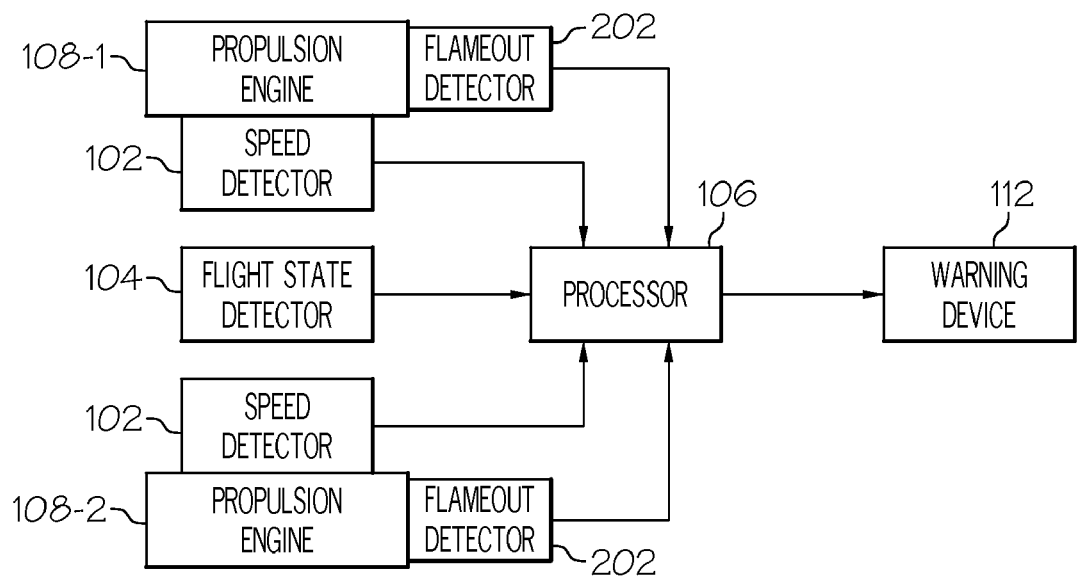
FIG. 2 depicts a functional block diagram of an exemplary alternative embodiment of a rotor lock prevention warning system.

With reference now to FIG. 2, it is seen that in some embodiments the system 100 could additionally be implemented with one or more engine flameout detectors 202. The engine flameout detectors 202, if included, are each associated with an aircraft gas turbine propulsion engine 108. Each flameout detector 202 is operable to detect a flameout of its associated engine 108 and to supply a flameout signal representative thereof to the processor 106. The processor 106 may then use the flameout signals to determine that an engine flameout has occurred. It will be appreciated that the flameout detectors 202, if included, could be implemented using any one of numerous suitable flameout detectors 202 now known or developed in the future.

Figure 3:
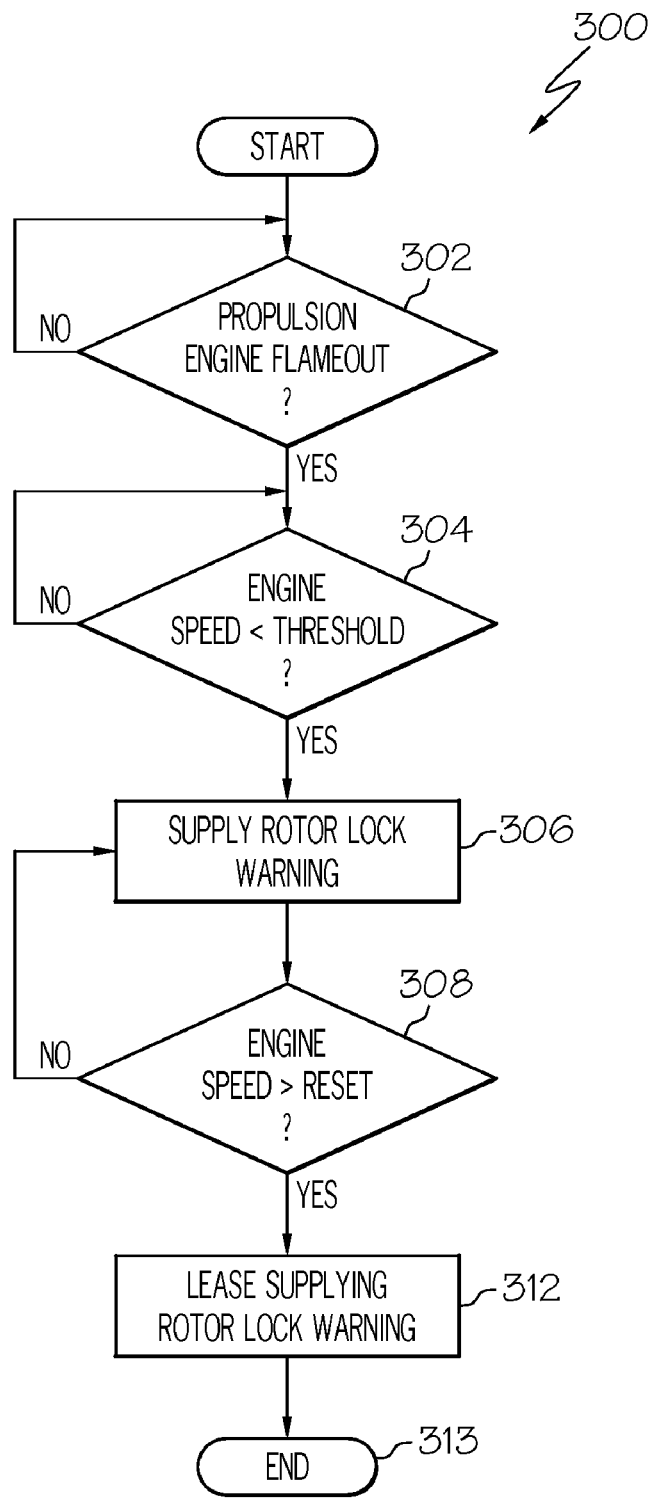
FIG. 3 depicts a flowchart of an exemplary method of preventing a rotor lock in a gas turbine engine that may be implemented by the systems of FIG. 1 or 2.

No matter which of the above-described system configurations is implemented, the system 100 provides a method of at least reducing the likelihood of a rotor lock condition in aircraft gas turbine propulsion engines 108. An exemplary embodiment of a suitable method is depicted in flowchart form in FIG. 3, and with reference thereto will now be described. Before doing so it is noted that the parenthetical references in the following paragraphs refer to like numbered flowchart blocks in FIG. 3.

Upon initiation of the method 300, a determination is made as to whether each propulsion gas turbine engine 108 on the aircraft has experienced a flameout (302). It will be appreciated that this determination may be made based on the flameout signals supplied from flameout detectors 202 (if included), or based on the rotational speed signals supplied from the rotational speed detectors 102. In either case, the rotational speed of each propulsion gas turbine engine 108 is determined and compared to the predetermined threshold speed (304). If the rotational speed of each propulsion gas turbine engine 108 is below the predetermined threshold rotational speed, the rotor lock warning is supplied to the flight crew (306). Thereafter, when the flight crew increases the airspeed of the aircraft so that the rotational speed of each propulsion gas turbine engine 108 exceeds a predetermined reset speed (308), the rotor lock warning will no longer be supplied (312).

From the above description it may be appreciated that the step of determining whether each propulsion gas turbine engine 108 has experienced a flameout (302) may be omitted. This is because, as was previously alluded to, if the rotational speed of a propulsion gas turbine engine 108 is below the predetermined threshold while the aircraft is in flight, this may also indicate that the engine 108 has experienced a flameout. Thus, the step of comparing the rotational speed of each propulsion gas turbine engine 108 to the predetermined threshold rotational speed (304) may also determine whether each propulsion gas turbine engine 108 has experienced a flameout.

The systems and methods described herein prevent, or at least inhibit the likelihood of occurrence of, aircraft gas turbine propulsion engine rotor lock conditions without reliance on relatively complex engine solutions and/or aircraft flight manual solutions.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of at least reducing the likelihood of rotor lock in an aircraft gas turbine engine, comprising the steps of:
   detecting if each propulsion gas turbine engine on the aircraft has experienced a flameout;
   detecting a rotational speed of each propulsion gas turbine engine; and
   supplying a warning to a flight crew if it is detected that each propulsion gas turbine engine has experienced a flameout and if the detected rotational speed of each propulsion gas turbine engine is below a predetermined threshold rotational speed.

2. The method of claim 1, further comprising:
   determining whether the aircraft is in flight; and
   supplying the warning to the flight crew if it is detected that each propulsion gas turbine engine has experienced a flameout and if the detected rotational speed of each propulsion gas turbine engine is below the predetermined threshold rotational speed and the aircraft is in flight.

3. The method of claim 2, further comprising:
   not supplying the warning to the flight crew if it is detected that each propulsion gas turbine engine has experienced a flameout and if the detected rotational speed of each propulsion gas turbine engine is below the predetermined threshold rotational speed and the aircraft is not in flight.

4. The method of claim 1, further comprising:
   no longer supplying the warning to the flight crew if the detected rotational speed of at least one propulsion gas turbine engine exceeds a predetermined reset rotational speed.

5. The method of claim 1, wherein the warning that is supplied to the flight crew warns the flight crew to increase aircraft airspeed.

6. The method of claim 1, wherein the warning that is supplied to the flight crew is an audible warning.

7. The method of claim 1, wherein the warning that is supplied to the flight crew is a visual warning.

8. The method of claim 1, wherein the warning that is supplied to the flight crew is an audio-visual warning.

9. The method of claim 1, wherein the flameout of each propulsion gas turbine engine is determined from the determined rotational speed.

10. A gas turbine engine rotor lock warning system for an aircraft, comprising:
    a rotational speed detector operable to determine rotational speed of the propulsion gas turbine engine and supply an engine rotational speed signal representative thereof; and
    a processor coupled to receive at least the engine rotational speed signal and operable to:
    (i) determine if the gas turbine engine has experienced a flameout,
    (ii) determine if the rotational speed of the propulsion gas turbine engine is below a predetermined threshold speed, and
    (iii) supply a rotor lock prevention warning signal if the gas turbine engine has experienced a flameout and the rotational speed of the propulsion gas turbine engine is below the predetermined threshold speed.

11. The system of claim 10, further comprising:
    an aircraft state detector operable to detect a flight state of the aircraft and supply a flight-state signal representative thereof,
    wherein the processor is further coupled to receive the flight-state signal and is further operable, in response thereto, to (i) determine the flight state of the aircraft and (ii) supply the rotor lock prevention warning signal if the aircraft is in flight and the rotational speed of the propulsion gas turbine engine is below the predetermined threshold speed.

12. The system of claim 11, wherein the processor is further operable to not supply the rotor lock warning signal if the aircraft is not in flight.

13. The system of claim 10, wherein the processor is further operable to:
    determine if the rotational speed of the propulsion gas turbine engine exceeds a predetermined reset rotational speed; and discontinue supplying the rotor lock prevention warning signal if the determined rotational speed of at least one propulsion gas turbine engine exceeds the predetermined reset rotational speed.

14. The system of claim 10, further comprising:
an audible warning generator coupled to receive the rotor lock prevention warning signal and operable, in response thereto, to supply an audible warning.

15. The system of claim 10, further comprising:
a visual warning generator coupled to receive the rotor lock prevention warning signal and operable, in response thereto, to supply a visual warning.

16. The system of claim 10, further comprising:
an audio-visual warning generator coupled to receive the rotor lock prevention warning signal and operable, in response thereto, to supply an audio-visual warning.

17. The system of claim 10, further comprising:
a flameout detector operable to determine if the propulsion gas turbine engine has experienced a flameout and, if so, supply a flameout detection signal,
wherein the processor is further coupled to receive the flameout detection signal and is further operable, in response thereto, to (i) determine whether the propulsion gas turbine engine has experienced a flameout and (ii) supply the rotor lock prevention warning signal if the propulsion gas turbine engine has experienced a flameout and the rotational speed of the propulsion gas turbine engine is below the predetermined threshold speed.

18. A gas turbine engine rotor lock warning system for an aircraft, comprising:
an aircraft state detector operable to detect a flight state of the aircraft and supply a flight-state signal representative thereof;
a plurality of rotational speed detectors, each rotational speed detector operable to detect a rotational speed of a propulsion gas turbine engine and supply an engine rotational speed signal representative thereof; and
a processor coupled to receive the flight-state signal and the engine rotational speed signal from each rotational speed sensor, the processor operable, in response to these signals, to:
  (i) determine the flight state of the aircraft,
  (ii) determine if the rotational speed of the propulsion gas turbine engines is below a predetermined threshold rotational speed, and
  (iii) if the aircraft is in flight and the rotational speed of the propulsion gas turbine engines is below the predetermined threshold speed, to supply a rotor lock prevention warning signal.

19. The system of claim 18, wherein the processor is further operable to not supply the rotor lock warning signal if the aircraft is not in flight.

20. The system of claim 18, wherein the processor is further operable to:
determine if the rotational speed of each propulsion gas turbine engine exceeds a predetermined reset rotational speed; and
discontinue supplying the rotor lock prevention warning signal if the determined rotational speed of at least one propulsion gas turbine engine exceeds the predetermined reset rotational speed.

* * * * *